Oct. 7, 1947.  L. R. HILL  2,428,568
SUPERVISORY SYSTEM FOR TEMPERATURE INDICATING SYSTEMS
Filed May 24, 1944
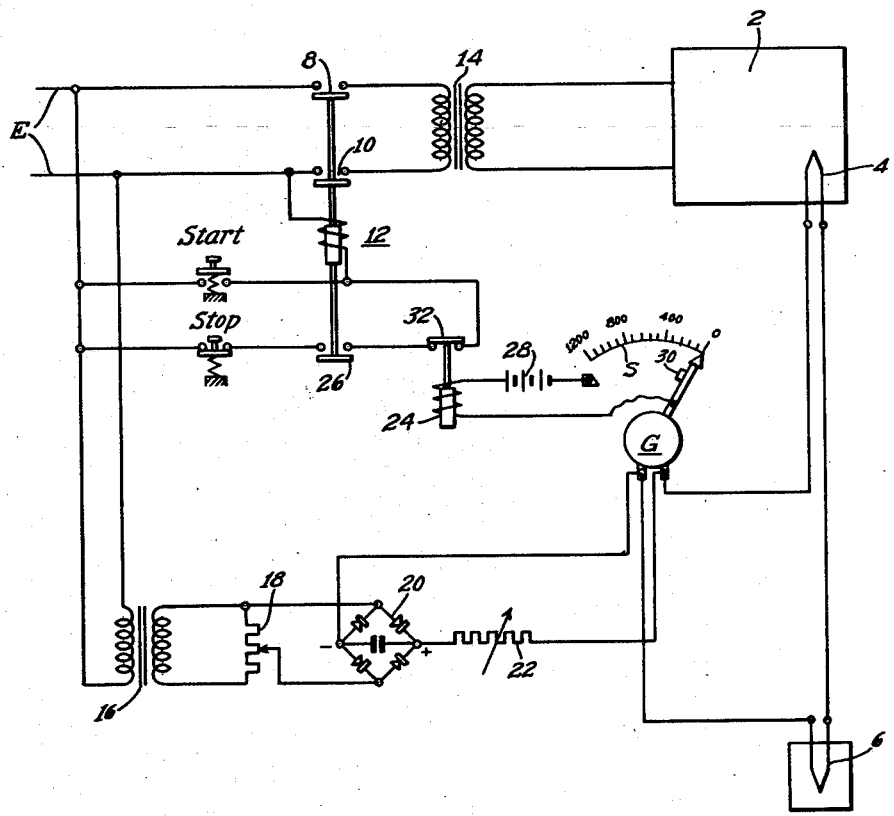
WITNESSES:
INVENTOR
Lawrence R. Hill.
BY
ATTORNEY Patented Oct. 7, 1947

2,428,568

UNITED STATES PATENT OFFICE 2,428,568

SUPERVISORY SYSTEM FOR TEMPERATURE INDICATING SYSTEMS

Lawrence R. Hill, Pittsburgh, Pa., assignor to Westinghouse Electric Corporation, East Pittsburgh, Pa., a corporation of Pennsylvania Application May 24, 1944, Serial No. 537,046

2 Claims. (Cl. 177—311)

1

This invention relates to thermoelectric pyrometers and, more particularly, to a thermoelectric temperature-indicating system including means for producing a substantial temperature indication on the temperature-indicating instrument should a fault occur in the thermoelectric circuit.

Frequently equipment burns up when thermocouples break or when they develop high resistance welds. In such instances, the temperature-regulating equipment (which has not been shown in the drawings since it forms no part of this invention) no longer has an accurate control over the system, and the temperature of the furnace or other element, the temperature of which is being controlled, increases beyond desired limits.

Accordingly, it is the principal object of this invention to provide a system which senses a fault in the thermoelectric circuit and interrupts the flow of heating energy to the element being heated.

Other objects and advantages will become apparent upon a study of the following specification when considered in conjunction with the accompanying drawing, in which the single figure thereof illustrates diagrammatically a thermoelectric temperature-indicating system embodying the principles of this invention.

The thermoelectric circuit which is used for indicating the temperature of the electric furnace 2 comprises the two thermocouple elements 4 and 6 which are connected in series circuit relationship and have connected thereacross a galvanometer G which measures the thermoelectric force generated in the circuit. The thermocouple 4 is disposed within the furnace 2, while the thermocouple 6 is located at some point where the temperature is maintained substantially constant, in the manner well known in the art. If the thermocouple 4 is subjected to temperature ranges above those to which the thermocouple 6 is subjected, a thermoelectric current flows in the circuit, and the electromotive force which actually is the voltage difference of the thermocouple elements and which causes this flow of current is indicated on the galvanometer G. The scale S of this galvanometer may be calibrated to indicate temperature directly. It may, however, be calibrated in any other suitable units. The electric furnace 2 is supplied from a suitable source of electrical energy, indicated generally at E, through the medium of the contact members 8 and 10 of the contactor 12 and a transformer 14. A second circuit supplied from this same source of electrical energy including the transformer 16, the potentiometer 18, and the bridge rectifier 20,

2 is connected across the terminals of the galvanometer G. A resistor 22 of some value considerably higher than that of the resistance of the galvanometer is connected in series in the circuit connecting the galvanometer to the bridge rectifier. The positive and negative terminals of the bridge rectifier are preferably connected to the positive and negative terminals of the galvanometer. In the same manner, the positive and negative terminals of the thermoelectric circuit as determined by whichever of the thermocouple elements is to be heated are preferably connected to the positive and negative terminals of the galvanometer. In this manner, assuming the thermoelectric circuit to be in an operative condition, the current flow in the thermoelectric circuit caused by the bridge rectifier 20 is opposed to that generated upon an increase in the temperature of the thermocouple 4 above that of the thermocouple 6. The value of the resistor 22 is preferably selected such that substantially a full-scale deflection of the galvanometer is caused by the voltage output of the rectifier 20 should an open circuit or a high resistance weld or other like fault condition develop in the thermoelectric circuit, and in addition of such a value that only a minor temperature indication of the galvanometer occurs as a result of the rectifier voltage when the thermoelectric circuit is closed. When the resistor 22 is so adjusted, for all practical purposes, the effect of the voltage produced by the rectifier 20 on the galvanometer is practically negligible. Hence, the galvanometer indicates only the actual electromotive force generated in the thermoelectric circuit.

A better understanding of the invention will probably be had by assigning specific values of voltage and resistance to the elements of the control circuit and solving for the voltages and currents which will occur with these values. These considerations are for a Chromel-Alumel thermocouple. Assuming the rectifier output to be one volt, the resistance of the resistor 22 as 20,000 ohms, the resistance of the galvanometer as 1.000 ohms, and the resistance of the thermocouple elements in series as one-half ohm, the current due to the protective circuit with the thermocouple system intact is:

$$I = \frac{E}{R} = \frac{1}{20,000} = .5 \times 10^{-4} \text{ amperes}$$

The one-half ohm resistance of the thermocouple circuit is here neglected. The voltage is equal to the resistance of the thermocouple × the current=to .5×.5×10⁻⁴=.025×10⁻³ volts. This gives a temperature-indicating error of about ½° C. for the thermocouple elements indicated. Should the thermocouple circuit be open-circuited, the current then becomes $$I=\frac{E}{R}=\frac{E}{R_{res}+R_{galv}}=\frac{1}{20,000+1,000}=.475\times 10^{-4} \text{ amps.}$$

voltage across terminals $$V=R_G\times I=1\times 10^{+3}\times .475\times 10^{-4}=47.5\times 10^{-3} \text{ volts}$$

giving a temperature indication of about 1200° C.

From the foregoing, if the maximum temperature at which the electric furnace were to be operated is approximately 1100° C., it will be seen that an overheated condition will be indicated by the galvanometer. Thus, an operator controlling the heating of the furnace may interrupt the supply of heating energy thereto until the thermoelectric circuit may be again put into operation.

The full-scale deflection of the galvanometer pointer may be utilized to automatically interrupt the supply of heating energy to the furnace. To this end, a relay 24 is provided in the holding circuit for the contactor 12, which circuit includes the contacts 26 of the contactor 12 and the contacts 32 of the relay 24. This relay 24 is connected in series with a battery 28, and the circuit is completed by the contacts 30 when the meter pointer is deflected across the scale a predetermined amount. This energizes the relay 24, causing its contacts 32 included in the holding circuit for the contactor 12, to open, and deenergize the coil of the contactor. This allows the contactor to drop out, opening its contacts 8 and 10 in the conductors connecting the electric furnace to the source of electrical energy.

It will be apparent to one skilled in the art that should the furnace 2 be heated, for example, by gas or oil, such means as the contactor 12 may be used to operate suitable valve mechanism in the supply line to the furnace to interrupt the flow of such fuel to the furnace.

The foregoing disclosure and the showings made in the drawing are merely illustrative of the principles of this invention and are not to be interpreted in a limiting sense. The only limitations are to be determined from the scope of the appended claims.

I claim as my invention:

1. A temperature-indicating system comprising, in combination, a thermoelectric element subjected to a temperature condition to be indicated, a second thermoelectric element maintained at a substantially constant temperature, a first electrical circuit interconnecting the thermoelectric elements, an instrument for indicating the thermoelectric force in said first electrical circuit, a source of electrical energy, a second electrical circuit connecting said instrument across said source of electrical energy so that the polarity of the connection is the same as that of the thermoelectric circuit, a resistor connected in series in said second electrical circuit, and of such ohmic value as to permit full-scale deflection of said instrument by said source when said first electrical circuit is inoperative, and to substantially prevent actuation of said instrument when said first electrical circuit is operative.

2. In a system for indicating the temperature of an electric furnace energized by a source of alternating current, the combination of, a first thermoelectric element disposed to be subjected to the heat of said furnace, a second thermoelectric element maintained at a substantially constant temperature, an indicating instrument, circuit means connecting the thermoelectric elements in a circuit with said indicating instrument to effect the application of thermoelectric current to said instrument, a rectifier, means for supplying alternating current from said source to said rectifier, circuit means including a resistor connecting said rectifier to said instrument so that the polarity of said connection is the same as that of the circuit connecting the thermoelectric elements to said instrument, to effect operation of said instrument in the same direction upon energization thereof by said rectifier as occurs upon energization thereof with the thermoelectric current, said resistor having a sufficiently high value to minimize the effect of the output of said rectifier upon said instrument when the circuit connecting the thermoelectric elements is complete, but providing sufficient output of the rectifier when the circuit connecting the thermoelectric elements is open to cause a full scale indication of said instrument.

LAWRENCE R. HILL.

REFERENCES CITED

The following references are of record in the file of this patent:

UNITED STATES PATENTS

| Number | Name | Date |
|---|---|---|
| Re. 14,280 | Bristol | Apr. 3, 1917 |
| 1,025,715 | Peake | May 7, 1912 |
| 1,270,851 | McElroy | July 2, 1918 |
| 1,388,589 | Mueller | Aug. 23, 1921 |
| 1,658,682 | Ipsen | Feb. 7, 1928 |
| 1,667,595 | Halle | Apr. 24, 1928 |
| 2,197,635 | Eggers | Apr. 16, 1940 |
| 2,262,207 | Scott et al. | Nov. 11, 1941 |
| 1,326,304 | Swan | Dec. 30, 1919 |
| 1,822,989 | Feussner | Sept. 15, 1931 |
| 1,988,658 | Kovalsky | Jan. 22, 1935 |
| 2,340,605 | MacLaren, Jr. | Feb. 1, 1944 |